United States Patent [19]

Rosa et al.

[11] Patent Number: 4,638,138
[45] Date of Patent: Jan. 20, 1987

[54] HIGH FREQUENCY INVERTER CIRCUIT FOR MELTING AND INDUCTION HEATING

[75] Inventors: John Rosa, Penn Hills, Pa.; William E. Frank, Baltimore, Md.

[73] Assignee: Westinghouse Electric Corp., Pittsburgh, Pa.

[21] Appl. No.: 633,775

[22] Filed: Jul. 23, 1984

[51] Int. Cl.⁴ .............................................. H05B 6/04
[52] U.S. Cl. .................................... 219/10.77; 361/93; 363/136; 363/37
[58] Field of Search .......... 219/10.77, 10.75, 10.49 R, 219/492; 363/136, 137, 138, 37, 96, 98, 124; 361/93

[56] References Cited

U.S. PATENT DOCUMENTS

| | | | |
|---|---|---|---|
| 3,422,342 | 1/1969 | Jackson | 363/136 |
| 3,448,367 | 6/1969 | Corey | 219/10.77 |
| 3,466,528 | 9/1969 | Adams | 363/136 |
| 3,816,690 | 6/1974 | Mittelmann | 219/10.77 |
| 4,009,430 | 2/1977 | Partridge | 219/10.77 X |
| 4,068,294 | 1/1978 | Anderson et al. | 363/96 X |
| 4,112,286 | 9/1978 | Alderman et al. | 219/10.77 X |
| 4,114,010 | 9/1978 | Lewis | 219/10.77 |
| 4,376,296 | 3/1983 | Bhagwat et al. | 363/138 |
| 4,567,555 | 1/1986 | Matsuse et al. | 363/37 X |

*Primary Examiner*—Philip H. Leung
*Attorney, Agent, or Firm*—Charles M. Lorin

[57] ABSTRACT

A two-pole inverter bridge has an inductor mounted between the two controlled switches in each pole and a resonant load is connected across the poles between ends of the inductors which are similarly situated relative to the terminals. In each pole one antiparallel circuit includes an auxiliary controlled switch and another antiparallel circuit includes only a diode. Fault protection is provided with an auxiliary source mounted between opposite ends of the inductors for applying reverse bias to the controlled switches of the poles whenever a fault in the inverter is detected.

7 Claims, 14 Drawing Figures

HIGH FREQUENCY INVERTER CIRCUIT FOR MELTING AND INDUCTION HEATING

The invention relates to solid state inverter circuit for the conversion of utility type AC power into high frequency single phase AC power, as can be used for applications including induction heating and melting.

Apparatus is known in the prior art which operates in the 1–20 kHz frequency range and which is suitable for such applications. The basic circuit is described in BBC-NACHRICHTEN, December 1974 pages 637–647. "Inverter Circuit For Induction Heating" by K. W. KANNGIESSER (See FIG. 1 on page 640). The inverter, there described, operates from a low output impedance DC source, typically, as obtained by rectification from the utility lines. The induction heating load may be considered as a series resonant circuit comprised of the equivalent resistance of the load, coupled with an inductance and a tuning capacitor. The output current, e.g. the load, is kept slightly leading the output voltage by maintaining the operating frequency somewhat lower than the resonant frequency, in order (1) to provide for natural commutation of the thyristors of the inverter circuit, and (2) to effectuate wide range control of the output power without having to control the DC-source voltage.

The transmitted net power, when taking into account intervening regenerated power from the resonant load, is controlled over a wide range by advancing or delaying gating of the thyristors, since thyristor conduction in fact recurrently terminates the regenerating phase.

Nevertheless, the basic circuit has its drawbacks. Thus, a minimum time lapse must be maintained to insure recovery of the outgoing thyristors, which time lapse depends upon the turn-off time thereof. Moreover, the operating frequency is limited by the slow recovery of the thyristors and by the stray inductance present in the diode leads. Also, upon commutation of the reverse parallel diodes by the thyristors, di/dt through the thyristors becomes very high and that may be in excess of the thyristor rating. Should be further taken into account the fact that the diode reverse recovery charge has to be "swept out" before the reverse current recedes. A large reverse current pulse can be damaging both to the thyristor and to the diode. Also in point is the limited dv/dt rating of the thyristors, since dv/dt could cause forward breakover of the thyristors. Shoot-through across the terminals might ensue. Finally, misfiring of the thyristors due to component failure in the inverter control circuit, or an external surge, could also lead to shoot-through with the basic circuit.

Accordingly, the basic circuit has been improved to avoid these drawbacks. Typical of such improved prior art circuits is the circuit shown in U.S. Pat. No. 4,009,430. Center-tapped inductors operating as a transformer are mounted in series with the thyristor across the terminals and the resonant load is connected to the center tap. Antiparallel thyristor circuits are provided each connected across the series combination of an outgoing main thyristor and the center tapped inductor. The center tapped inductor limits the rate of rise of fault current in case of a shoot-through and it also increases substantially the reverse voltage applied to the outgoing thyristors, especially as a result of the transformer action. The commutating thyristors are also effective to overcome the drawback of using diodes as in the basic circuit.

Another approach with a simpler but as effective solution as the one described in U.S. Pat. No. 4,009,430 is desirable.

SUMMARY OF THE INVENTION

While U.S. Pat. No. 4,009,430 uses reverse parallel paths involving at least one center tapped inductor and at least two reverse parallel thyristors, it is now proposed to use a single inductor within a pole of the inverter, and to provide commutation of the main switches with only one auxiliary thyristor and with a reverse current diode to effect the respective switch commutations at the high frequency of operation of the main thyristors of the inverter.

DETAILED DESCRIPTION OF THE INVENTION

The invention relates to a high frequency solid state inverter circuit for converting into a single phase AC output and at high frequency, power derived from the industrial AC power supply, for applications including induction heating and melting. The range of operation is in the 1–20 kHz frequency range.

Figure 1:
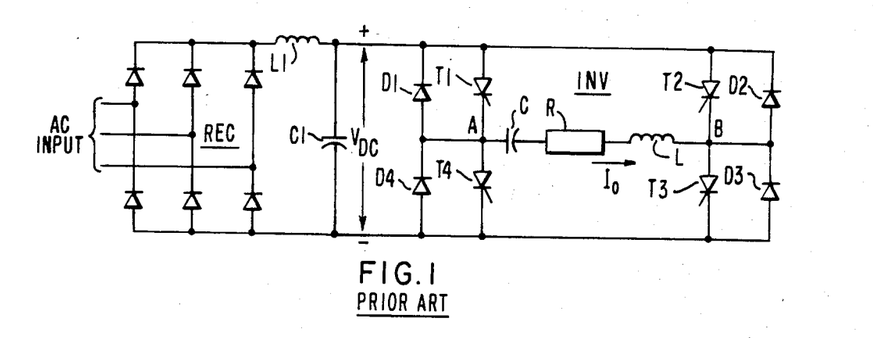
FIG. 1 shows the basic circuit of the Kanngiesser prior art.

Referring to FIG. 1, there is shown the prior art basic power circuit of an inverter, as described in BBC NA-CHRICHTEN December 1964 pages 637–647 "Inverter Circuit For Induction Heating" by K. W. KANNGIESSER.

The inverter INV operates from a low output impedance voltage source ($V_{DC}$) obtained by rectification (REC) from the AC industrial power supply. Filtering is achieved by series inductor L1 and parallel capacitor C1. The induction heating load is illustrated by its series resonant equivalent circuit comprising the heating load resistance R, the coupling inductance L (which also includes the cable inductance) and the tuning capacitor C of the induction heating coil. The inverter includes two poles of two thyristors (T1, T4 and T2, T3, respectively) across DC terminals TA, TB, the resonant load extending transversely across the nodal points (A, B) of the pairs of thyristors. Diodes D1–D4 are associated in antiparallel fashion to the respective thyristors T1–T4.

Figure 2:
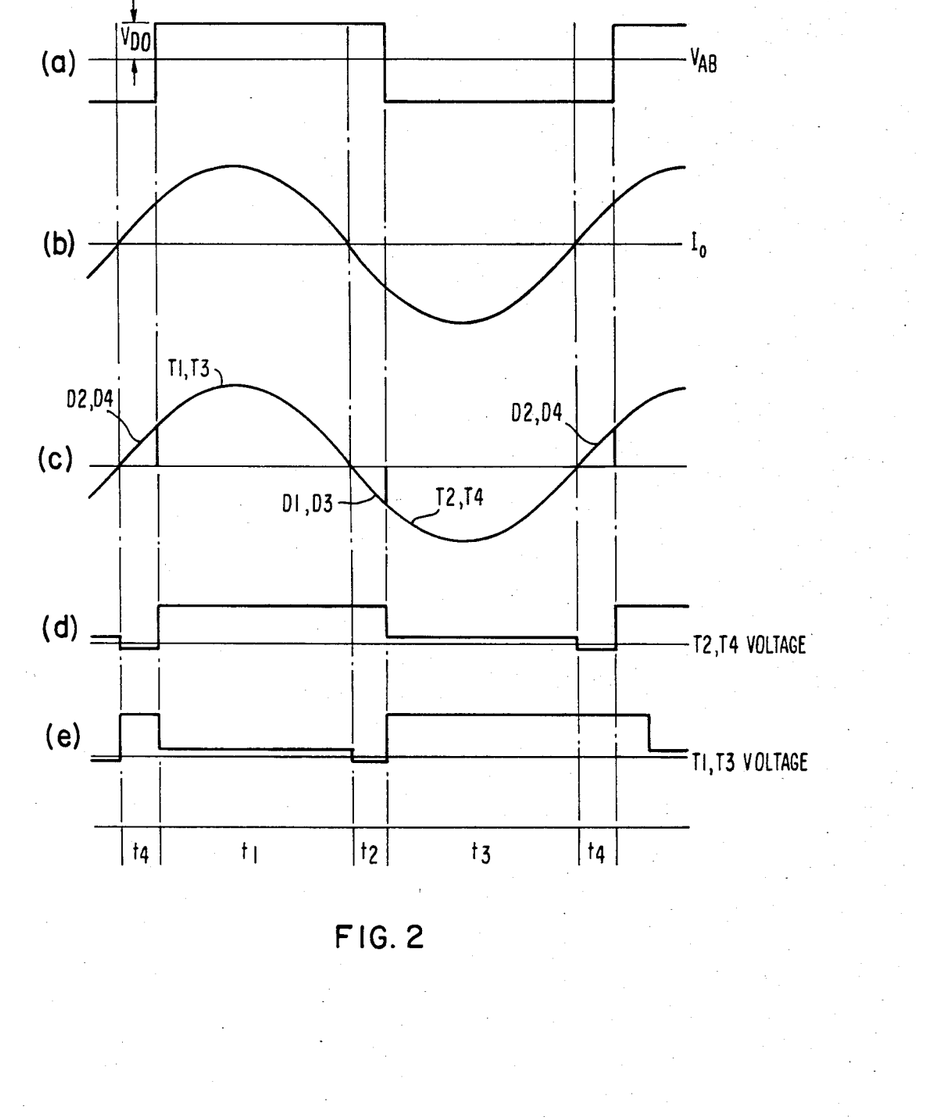
FIG. 2 is a set of curves illustrating the operation of the circuit of FIG. 1.

Referring to FIG. 2, curve (a) shows the output voltage $V_{AB}$ appearing between the two ends of the resonant load. Curve (b) is the load current $I_o$ flowing across the load. Curve (c) shows the thyristor and diode currents in time and amplitude relationship. Curves (d) are the voltages appearing across thyristors T2, T4, whereas curves (e) are the voltages appearing across the other pair of thyristors T1, T3 when they are blocking, conducting and reverse biased.

It appears that the output, or load current $I_o$ is slightly leading the output voltage $V_{AB}$. This is accomplished by keeping the operating frequency somewhat lower than the inherent resonant frequency $f_r = \frac{1}{2}\pi\sqrt{LC}$. This mode of control dispenses with the necessity of controlling the DC source voltage to achieve a wide range of control for the output power. It also serves to provide natural commutation of the thyristors of the inverter.

Referring to FIG. 2, under steady operation the following phases are set forth. Considering first the time interval $t_1$ during which thyristors T1 and T3 are conducting, there is shown under (c) a corresponding segment of the load current which is defined by its front edge. Curve (b), however, shows current $I_o$ as near-sinusoidal, due to the resonant nature of the load. During time interval $t_1$ the polarities of output voltage $V_{AB}$ (curve (a)) and of the load current $I_o$ (curve (b)) are the same. Therefore, electrical power is being delivered from the source to the load during such time interval $t_1$. During that time, as shown by curve (d), thyristors T2, T4 are effectively blocking forward voltage, the latter being equal to voltage $V_{DC}$ supported between terminals TA, TB.

When time interval $t_1$ ends, due to resonant charging of the load tuning capacitor C, load current $I_o$ changes polarity. Since current flow of this polarity is now blocked by thyristors T1, T3, during the subsequent time interval $t_2$ current passes through the reverse parallel diodes, D1, D3. A voltage drop appears across each diode which is applied in the reverse direction across the associated thyristors T1, T3 (curve (e)), thus forcing the thyristors to recover. During time interval $t_2$ the polarities of output voltage $V_{AB}$ and load current $I_o$ are opposite. Therefore, electrical power is now being fed back from the load into the DC source.

Provided time $t_2$ has been long enough to allow for thyristors T1, T3 to recover, the control circuit can effectively fire thyristors T2, T4 in its turn. As a result, diodes D1, D3 become immediately reverse biased by $V_{DC}$ and load current $I_o$ is taken over by the conducting thyristors T2, T4 (curve (c)). Coincidentally, thyristors T1, T3 (which have now recovered) become forward-biased by voltage $V_{DC}$ (curve (d)), namely, during time interval $t_3$. During time $t_3$ the polarities of $V_{AB}$ and $I_o$ are again identical. Therefore, electrical power is being fed from the DC source to the load.

Time interval $t_3$ ends when $I_o$ changes polarity again. Since, thereafter, current flow in this direction is blocked by thyristors T2, T4, current passes during the subsequent time interval $t_4$ through reverse parallel diodes D2, D4 (curve (c)). The voltage drop thereacross reverse biases thyristors T2, T4, thus, forcing the latter to recover. The polarities of $V_{AB}$ and $I_o$ are now opposite, which indicates that, during time interval $t_4$, power is being fed back from the load into the source.

The net electrical power transmitted to the load is the difference between the power transmitted from source to the load during time interval ($t_1$, $t_3$) and the power regenerated from the load to the source during time interval ($t_2$, $t_4$). Thus, the net electrical power transferred can be controlled over a wide range by advancing, or delaying, the gating of the pairs of thyristors T1, T3 and T2, T4, which gating terminates conduction in the respective reverse parallel diodes, thereby terminating the regenerative time intervals. In order to insure recovery of the previously conducting thyristors, however, a minimum elapse time ($t_2$, $t_4$) must be maintained. The duration of such time interval depends upon the characteristic thyristor turn-off time.

There are other limitations imposed by or to power semiconductor switches which require significant modifications of the basic power circuit of FIG. 1. These limitations are the following:

(1) Slow recovery of thyristors under low reverse bias conditions.

During time intervals $t_2$ and $t_4$ the "outgoing" thyristors are reverse biased by the forward drop of the associated reverse parallel diodes. This voltage drop (typically 1 volt) is generally insufficient to force recovery within the device turn-off time prescribed. In the basic circuit this becomes a limiting factor for the highest possible operating frequency. This is further aggravated by the presence of stray inductances in the diode leads which reduce the effective reverse bias across the thyristors even more.

(2) Limited di/dt rating of thyristors.

When at the end of time interval $t_2$ and $t_4$ the thyristors "commutate" the reverse parallel diodes of the formerly conducting thyristor pair, in the basic circuit the rate of rise of current, di/dt, through the thyristors is extremely high (theoretically, it is even infinite).

(3) Reverse recovery charge of diodes.

At the same instants of commutation, conduction through the diodes does not cease when the current is decreased to zero. A reverse current will flow until the diode reverse recovery charge is "swept out". In the basic circuit, where the reverse current is not limited by the circuit, this phenomenon could result in a very short, but very high, reverse current pulse aggravating the situation. It is also potentially harmful to the diodes.

(4) Limited dv/dt rating of thyristors.

When at the end of time intervals $t_2$ and $t_4$ the thyristors take over conduction, the voltage on the previously reverse biased thyristors rises instantaneously to $+V_{dc}$. In the basic circuit this would mean an extremely high (theoretically infinite) rate of rise of the forward voltage, dv/dt, as seen in traces (d) and (e). Such dv/dt could cause forward breakover of the thyristors and could result in a direct short circuit (shoot-through) across the terminals of the DC source.

(5) Misfiring of thyristors.

A component failure of the inverter control circuit, or an external electrical noise, may result in gating one, or both, of the thyristors supporting the forward voltage, while the other thyristor pair is still conducting. In the basic circuit, again, this would lead to a direct short-circuit across the terminals of the DC source. In both shoot-through cases (4) and (5) here above, the following di/dt of the fault current is extremely high (theoretically infinite) and could result in the destruction of the thyristors. Furthermore, this would make protection against such short-circuit, by whatever protective means, very difficult.

Figure 3:
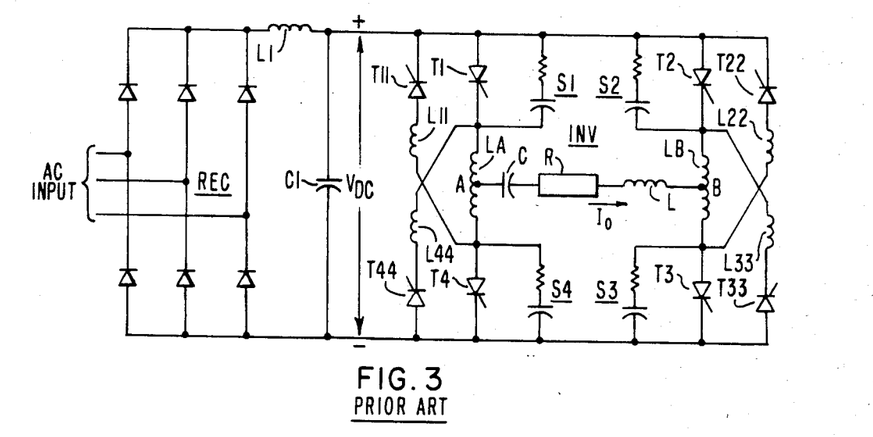
FIG. 3 shows the basic circuit of FIG. 1 improved by the technique of U.S. Pat. No. 4,009,430.

In order to solve these problems, several improvements over the above circuit of FIG. 1 have been proposed in the prior art. For the purpose of illustration reference is made to U.S. Pat. No. 4,009,430. FIG. 3 shows the main circuit in this U.S. Patent. Referring to FIG. 3, in each pole is provided an autotransformer formed with a center-tapped inductance and the resonant circuit is mounted across the poles between the center taps thereof (A,B). In addition, an antiparallel circuit, including inductance and thyristor in series, is mounted across the series combination of one center tapped inductance and an associated thyristor. Thus, (T11, L11) are associated with thyristor T1, (T22, L22) are with T2, (T33, L33) are with T3 and (T44, L44) are with T4. In this circuit, the high di/dt and the coupled diode reverse recovery problems are solved by the insertion of the respective series inductors L11, L22, L33 and L44 in the former reverse parallel diode paths wherein the diodes are replaced by thyristors. Center tapped inductors (LA and LB) limit the rate of rise of fault current, thereby solving shoot-through problems. In conjunction with the conventional (R-C) snubber networks S1, S2, S3 and S4, the inductors effectively limit the dv/dt across the thyristors. During the above-described time intervals $t_2$ and $t_4$, the substantial $L \cdot dI_o/dt$ inductive voltage drop developed across these inductors is doubled as a result of the transformer action within the closely coupled inductor halves of the transformers. Such voltage drop appears, in the reverse direction, across the "outgoing" thyristor pair. In order to prevent trapped energy build-up in auto-transformer LA and LB, reverse parallel diodes D1, D2, D3 and D4 of the basic circuit of FIG. 1 are now replaced by reverse parallel thyristors T11, T22, T33 and T44.

Figure 4:
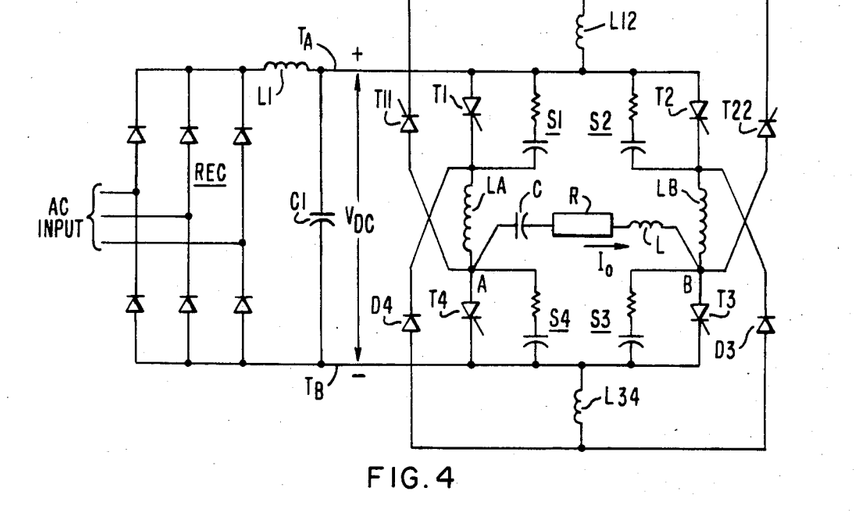
FIG. 4 is one embodiment of the circuit according to the present invention.

Referring to FIG. 4, the circuit according to the present invention is now illustrated by one embodiment thereof. Two separate and single inductances (LA, LB) are inserted each between the two thyristors (T1, T4, or T2, T3) of one pole, whereas the resonant circuit is mounted between two ends (A,B) of the respective inductances which are proximate to one terminal illustrated in FIG. 4 as the negative terminal. It is understood, however, that the circuit would operate as well if the resonant load were connected between the two opposite ends of LA and LB, respectively. In such case, however, T11 and D4 must be interchanged, as well as T22 and D3. The circuit according to the invention further distinguishes itself by the antiparallel circuits. From node A common to inductance LA and the anode of thyristor T4, the antiparallel circuit associated with thyristor T1 of the same pole includes the same combination of an auxiliary thyristor T11 and an auxiliary inductance L12 across the series combination of LA and T1. In contrast, however, the antiparallel circuit associated with thyristor T4 includes a series combination of an auxiliary diode D4 and an inductance L34 mounted across the series combination of LA and T4. The same arrangement is provided on the other pole, where an auxiliary thyristor T22 is associated with LB and T2 whereas an auxiliary diode is associated with LB and T3. It is observed also that auxiliary inductance L12 is common to both antiparallel circuits relative to T1 and T2 and relative to auxiliary thyristors T11 and T22. Similarly, auxiliary inductance L34 is common to both antiparallel circuits relative to T4 and T3 and relative to auxiliary diodes D4 and D3.

Figure 5:
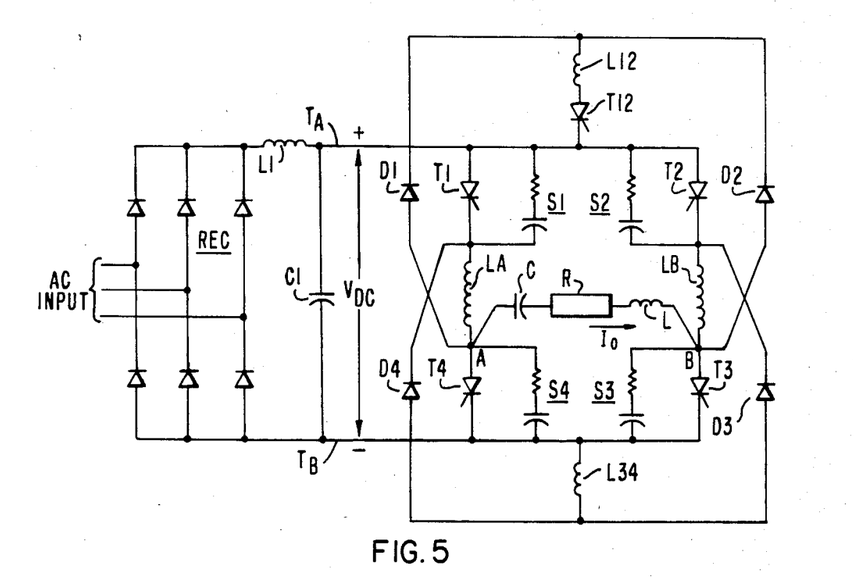
FIG. 5 is a second embodiment of the circuit according to the invention.

The embodiment of FIG. 5 is a modification of the embodiment of FIG. 4 wherein auxiliary thyristors T11 and T22 are replaced by diodes D1 and D2 in the respective antiparallel circuits and a single thyristor T12 is used in common to both and inserted in series with L12. As a result, in FIG. 4 where one thyristor T11 (or T22) is associated with one conducting thyristor during flow of $I_o$ in one direction from one pole to the other, a diode D3 (or D4) is associated with the other conducting thyristor T3 (or T4). It is understood, however, that the circuit of FIG. 4 would operate as well with a thyristor, instead of a diode being associated with T3 and T4, and with a diode, instead of a thyristor being associated with T1 and T2. In this case, however, the load circuit is connected to terminals LA, LB.

In addition, in the circuit of FIG. 4, each antiparallel circuit might include separate inductances in series. It is to simplify the circuitry, taking advantage of the particular configuration according to the invention, that such inductance is used commonly for the two poles, as shown by L12 for the positive terminal, and by L34 for the negative terminal.

A third improvement is illustrated in FIG. 5, in which the thyristor, or gating function, is used in common for the two poles, as shown by T12 in series with inductance L12, whereas, the diode function is separately located in each antiparallel circuit at D1 from node A, at D2 from node B.

The operation of the circuit of FIG. 4 will now be described by reference to FIGS. 6A–6F. Each cycle of operation is divided into four stages corresponding to four specific time intervals: $(t_1-t_4)$. These stages correspond to those of FIG. 2 with the distinction, however, that time intervals $t_1$ and $t_3$ are divided into subintervals $(t_{1a}, t_{1b})$ and $(t_{3a}, t_{3b})$ respectively. Current paths are shown traced on the circuit during such time intervals. The current paths are indicated with heavy lines.

During time interval $t_{1b}$, thyristors T1, T3 are conducting. They conduct a corresponding segment of the load current $I_o$ shown in FIG. 5 by trace (c). The $V_{AB}$ output voltage (curve (a)) is now the algebraic sum of the $V_{dc}$ source voltage and the $L \cdot dI_o/dt$ voltage drop across inductor LA.

At the end of time interval $t_{1b}$, load current $I_o$ reverses (curve (b)) and time interval $t_2$ begins. Thyristors T1, T3 cease to conduct, thereby blocking the reverse polarity current. At this instant, auxiliary thyristor T11 is fired, thus, opening a path for the reverse polarity current through T11, reverse current diode D3 and inductors L12, LB and L34. The inductive voltage drop $L \cdot dI_o/dt$ across L12 appears as a reverse bias across thyristor T1, thereby forcing the latter to recover. The sum of inductive voltage drops across LB and L34 appears as a reverse bias across thyristor T3, thus, forcing the latter to recover. The fact that the two reverse biases are not equal is of no consequence as long as the smaller of the two voltages (across T1) is sufficient to force recovery within the turn-off time required.

The duration of time interval $t_2$, and later the duration of time interval $t_4$ are controlled according to the afore-stated requirements. A minimum of time must be maintained to insure safe commutation of the thyristors, while further delay in firing the thyristor pair next in sequence, is used to adjust (reduce) the output power to the desired level.

Time interval $t_{3a}$ starts when thyristors T2, T4 are fired. $I_o$ is now commutated by reverse conducting devices T11 and D3 on to T4 and T2 at a rate of rise of current determined by inductors L12 and L34. The commutation and reverse recovery shoot-through paths through L12, T11, T4 and T2, D3, L34, respectively, are indicated by dotted lines in FIG. 6C. Commutation is complete when the currents through T2 and T4 match the instantaneous value of $I_o$, at which time T11 and D3 begin their reverse recovery. The reverse recovery currents are limited in rate and magnitude by inductors L12 and L34. Subinterval $t_{3a}$ ends when T11 and D3 are "swept out", at which time they effectively support reverse voltage.

Figure 6A:
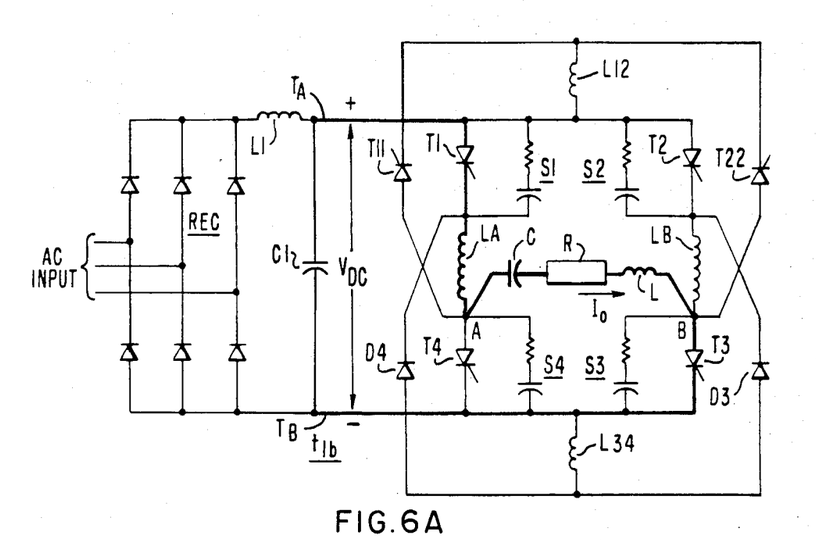
FIGS. 6A–6F illustrate the various operative phases of the circuit of FIG. 4.
Figure 6B:
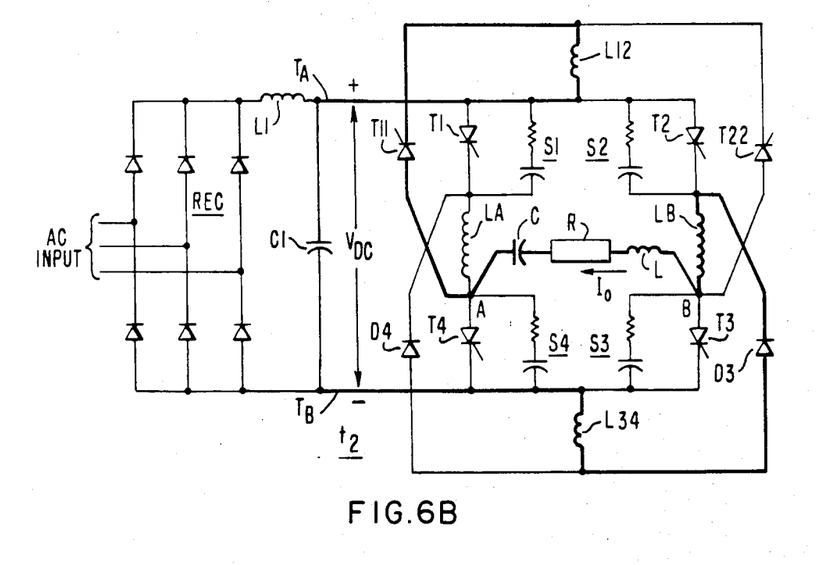
Figure 6C:
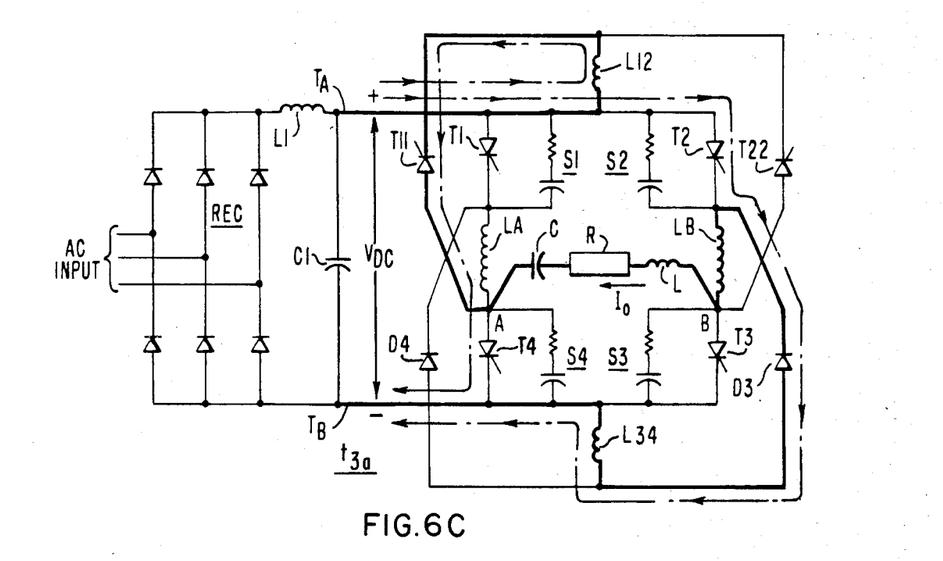
Figure 6D:
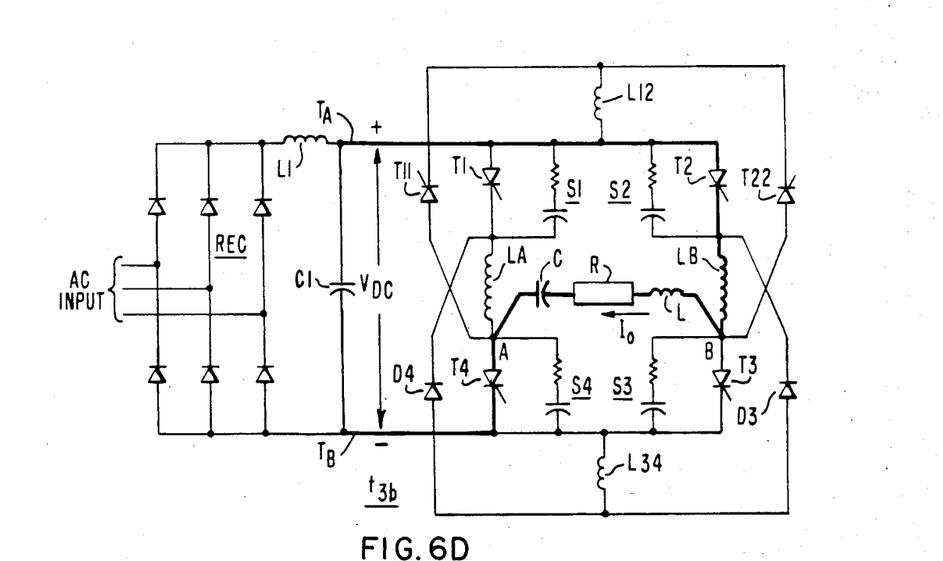
Figure 6E:
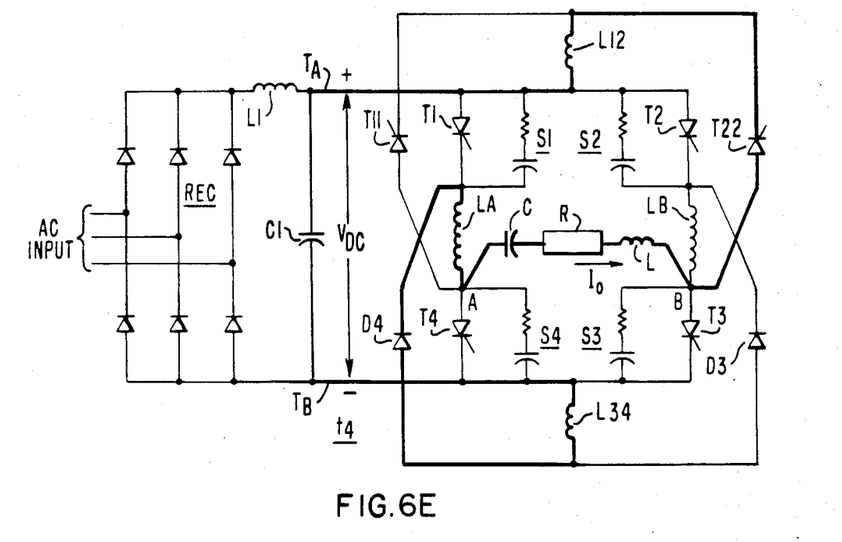
Figure 6F:
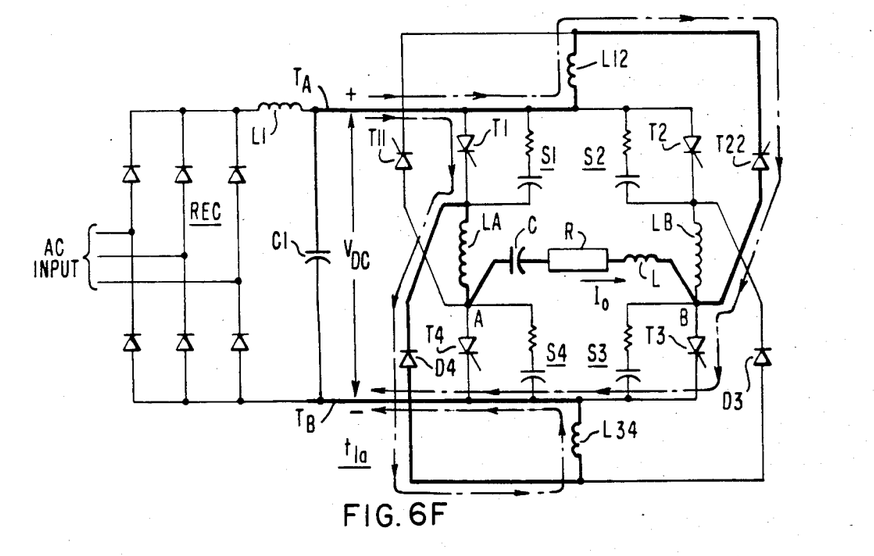

During the subsequent subinterval $t_{3b}$, $I_o$ is flowing through conducting thyristors T2, T4 (FIG. 6D). This would result in a step-like rise of forward voltage across the just recovered thyristors T1, T3, except that dv/dt is "cushioned" by the snubber networks consisting of (R-C) pairs of networks S1 and inductor LA and S3 and LB, respectively.

Time interval $t_4$ starts when load current $I_o$ reverses polarity, at which time firing of auxiliary thyristor T22 opens a path to $I_o$ through T22, reverse current diode D4 and inductors L12, LA and L34 (FIG. 6B). The inductive voltage drops across these inductors now provide reverse bias for thyristors T2, T4 in the same manner as was described for interval $t_2$.

Subinterval $t_{1a}$ starts when thyristors T1, T3 are fired, thereby leading to effective reverse biasing with a limited di/dt for T22 and D4 by the end of the subinterval, (FIG. 6F) thus completing one full cycle.

The operation of the circuit of FIG. 5 is the same as for FIG. 4. As earlier stated a difference resides in that the two auxiliary thyristors T11, T22 are now replaced by reverse current diodes D1, D2 and that a common auxiliary thyristor T12 is used to be fired at the beginning of both time intervals $t_2$ and $t_4$.

Figure 7:
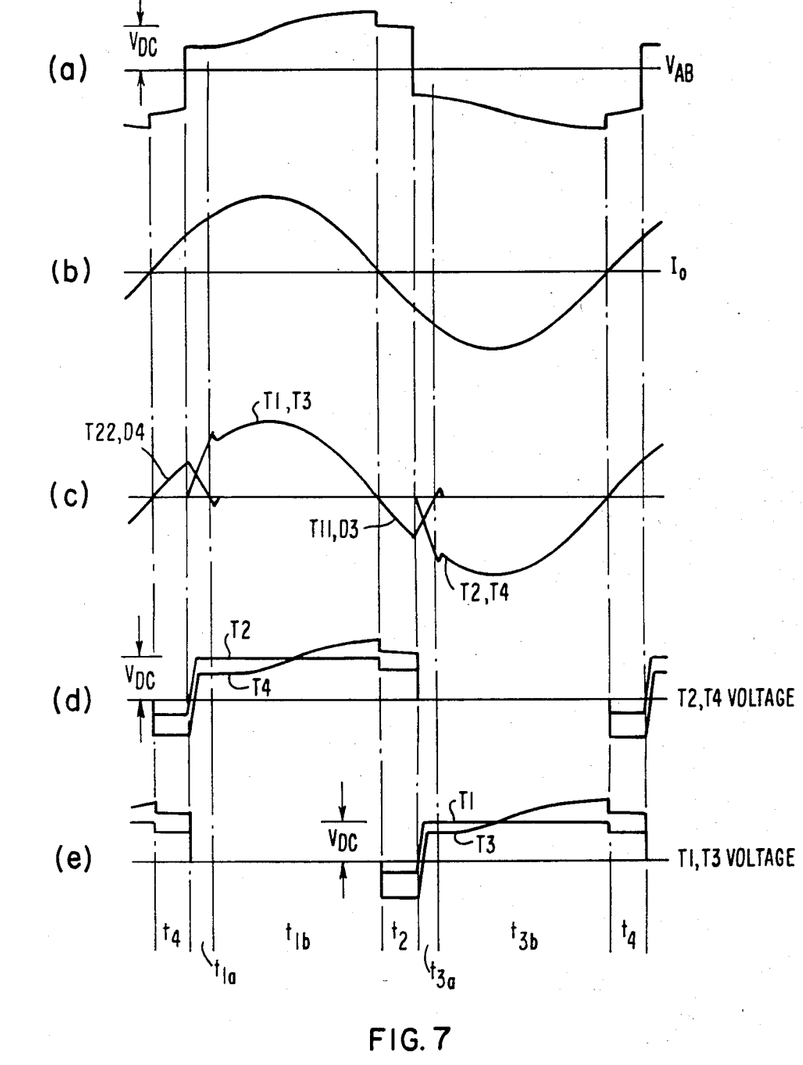
FIG. 7 is a set of curves illustrating the operation of the circuit of FIG. 4.

In case inductor pairs L12, L34 and/or LA, LB are built with a magnetic core, it is important to realize that the two coils of either inductor pair can be wound on the same core. This structure is especially economical if a single turn winding is used. This technique provides magnetic coupling between the separate inductors. In the case LA, LB are so coupled as a pair, it will be necessary to replace reverse current diodes D3, D4 with thyristors in the case of FIG. 4, or to insert an auxiliary thyristor in series with inductor L34 in the case of FIG. 5. The further effect of coupling LA, LB as a pair is to equalize the voltages across the thyristors. The voltages across T1 and T2 will not assume the same shape as the voltages across T3 and T4 which are shown in FIG. 7 by separate traces under (d) and (e).

Should a shoot-through fault occur, in both circuits of FIGS. 4 and 5, inductors LA, LB will effectively limit the rate of rise of fault current, thus protecting the thyristors from excessive di/dt and allowing time for clearing the fault by a protective circuit before the fault current reaches a destructive level.

Figure 8:
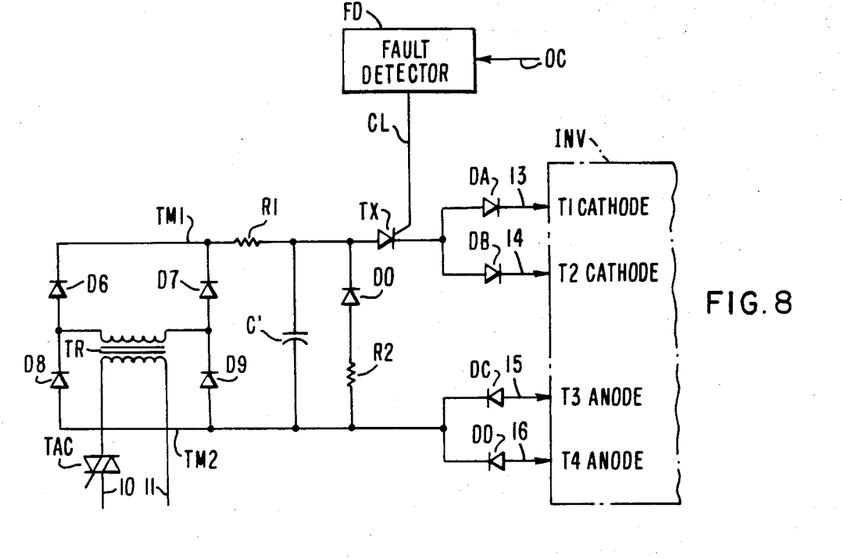
FIG. 8 is the circuit according to the invention with the addition of a fault current protective circuit.

A practical protection circuit is shown in FIG. 8. This circuit can be added to either circuit of FIGS. 4 and 5 indicated by the arrows. This circuit includes a fault detector FD responsive to an overcurrent sensed via line OC from the DC link to the inverter INV, thus, between voltage source $V_{DC}$ and the thyristors ($T_1$–$T_4$). The overcurrent occurs, for instance, whenever the outgoing thyristor fails to be turned-OFF.

When a fault occurs, the fault detector FD generates on line CL a gating signal to thyristor TX which causes by-lines 13–16 the thyristors of $T_1$–$T_4$ of the inverter to become reverse-biased, thereby preventing damage through the faulty path. FIG. 8 shows on the left side an auxiliary voltage source which is due to a capacitor C' being charged-up from the rectified secondary voltage of a transformer TR. When providing reverse-bias to the main thyristors, capacitor C' is discharged because at the same time, charging of capacitor C' from the primary side of the transformer is suppressed. Controlled charging of capacitor C' is provided by a triac device TAC which is used to replenish the auxiliary source and keep it charged until a fault occurs. Operation of the protection circuit is as follows:

Capacitor C' is charged by a low power transformer-rectifier unit TR when firing a triac TAC until it reaches a voltage higher than $V_{dc}$. Transformer TR is mounted across a rectifier bridge comprised of diodes D6–D9. If fault sensing circuit (FD) detects an excessive current drawn from the DC source, thus, ahead of inverter INV, indicating a shoot-through condition, gating to thyristors T1 through T4 of the inverter (FIG. 4) and to the triac TAC of FIG. 8 (operating as an ac switch) is suppressed, whereas thyristor TX is fired. Thyristor TX when conducting effectively connects capacitor C' through the pairs of diodes DA, DB and DC, DD which are mounted across the inductors LA, LB within the inverter and which are experiencing a voltage higher than $V_{dc}$ there across. Consequently, all four thyristors T1 through T4 become reverse biased by the respective series connected diodes DA–DD. With proper sizing of capacitor C', this reverse bias can be maintained for a duration sufficient to insure recovery of the thyristors. Subsequently, C' discharges through inductors LA, LB. Excessive resonant voltage reversal across capacitor C' is prevented by free-wheeling a diode DO mounted in parallel with capacitor C'. A low resistance R2 can be provided in series with diode DO in order to dissipate the energy stored in the inductors LA, LB. Once the current through thyristor TX coasts to zero, triac TAC is again gated ON, in order to replenish the charge across C'. Resistor R1 in series with capacitor C' serves to limit the inrush current to a safe level. Once capacitor C' is recharged, the gating sequence of the switches of the inverter is resumed.

Figure 9:
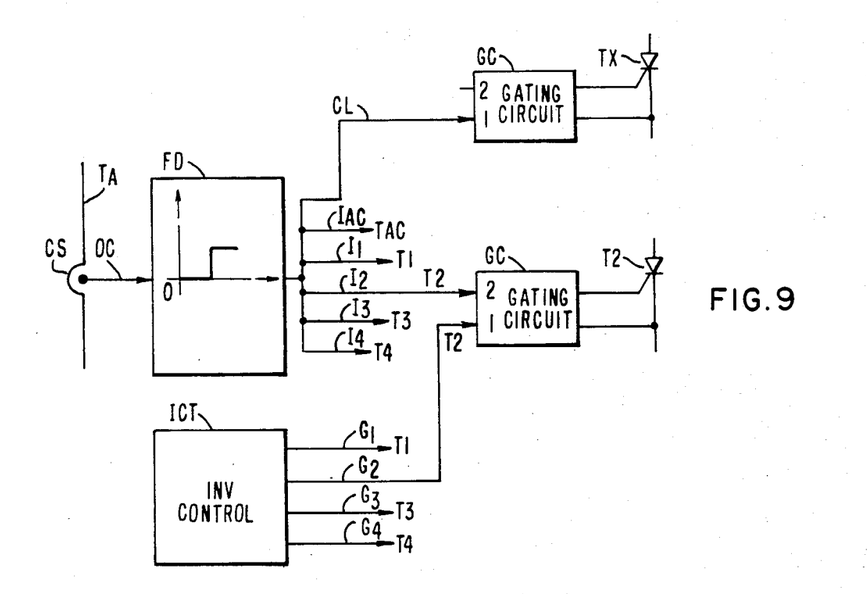
FIG. 9 shows control circuitry to gate, or inhibit switches by operation of the fault current protective circuit of FIG. 8.

Referring to FIG. 9, control circuitry is shown for the purpose of illustration as can be used to gate, or inhibit switches by operation of the fault current protective circuit of FIG. 8.

The circuit of FIG. 9 shows the inverter controller ICT which gates the thyristors $T_1$–$T_4$ sequentially, via lines $G_1$–$G_4$, to activate the conduction command input (1) of the respective gating circuits GC. FIG. 9 shows line $G_2$ from controller ICT going to input (1) of gating circuit GC of thyristor $T_2$. Current sensor CS senses the DC link current in terminal TA. Fault detector FD receives an overcurrent signal on line OC which is translated into a fault detection signal on line CL applied on conduction command input (1) of the gating circuit GC of thyristor TX. Fault detector FD also generates on lines $I_1$–$I_4$ an inhibit signal applied to the inhibit command input (2) of the gating circuits GC of the respective thyristors $T_1$–$T_4$. In addition, an inhibit signal is applied via line $I_{AC}$ to the inhibit command input of the gating circuit of triac TAC.

We claim:
1. A two-pole inverter bridge mounted between opposite DC terminals supporting a voltage source including two poles mounted across said DC terminals, and a resonant load mounted across said poles;
  each pole including first and second controlled switches and an inductor therebetween;
  each pole having an inductor connected in series with said first and second switches, one end of said inductor being connected to the cathode electrode of one of said first and second switches, the other end of said inductor being connected to the anode electrode of the other of said first and second switches, the ends of respective inductors associated with identical electrodes forming two pairs across said poles;

said resonant load being connected between the ends of one of said two pairs;

each pole having a first circuit connected in antiparallel to one of said first and second switches and to said inductor, and a second circuit connected in antiparallel to the other of said first and second switches and to said inductor;

said first antiparallel circuit being effective to turn OFF a corresponding one of said switches upon one alternation of said resonant load, said second antiparallel circuit being effective to turn OFF a corresponding one of said switches upon the other alternation of said resonant load;

one of said first and second antiparallel circuits in each pole being connected to one of the ends of said resonant load and having an auxiliary switch and an auxiliary inductor in series thereto;

the other of said first and second antiparallel circuits in each pole having a diode and an auxiliary inductor in series thereto.

2. The inverter bridge of claim 1 with said first antiparallel circuits including an auxiliary inductor in series which is common to both.

3. The inverter bridge of claim 2 with said second antiparallel circuits including an auxiliary inductor in series which is common to both.

4. The inverter bridge of claim 2 with each of said first antiparallel circuits having an auxiliary diode in series with said auxiliary switch and with said common auxiliary inductor, said auxiliary switch being common to both of said first antiparallel circuits.

5. The inverter bridge of claim 1 with one of said first and second switches of one of said poles having a first antiparallel circuit associated thereto being controlled for conduction with one of said first and second switches of the other of said poles having a second antiparallel circuit associated thereto being controlled for conduction.

6. The inverter bridge of claim 5 with said resonant load being an induction heating head for induction heating treatment of metal.

7. A protective system associated with a two-pole inverter bridge, said two-pole inverter bridge mounted between opposite DC terminals supporting a voltage source including two poles mounted across said DC terminals, and resonant load mounted across said poles;

each pole including first and second controlled switches and an inductor therebetween;

each pole having an inductor connected in series with said first and second switches, one end of said inductor being connected to the cathode electrode of one of said first and second switches, the other end of said inductor being connected to the anode electrode of the other of said first and second switches, the ends of respective inductors associated with identical electrodes forming two pairs across said poles;

said resonant load being connected between the ends of one of said two pairs; each pole having a first circuit connected in antiparallel to one of said first and second switches and to said inductor, and a second circuit connected in antiparallel to the other of said first and second switches and to said inductor;

said first antiparallel circuit being effective to turn OFF a corresponding one of said switches upon one alternation of said resonant load, said second antiparallel circuit being effective to turn OFF a corresponding one of said switches upon the other alternation of said resonant load;

one of said first and second antiparallel circuits in each pole being connected to one of the ends of said resonant load and having an auxiliary switch and an auxiliary inductor in series thereto;

the other of said first and second antiparallel circuits in each pole having a diode and an auxiliary inductor in series thereto; the system including reverse bias means for establishing between each end of said pole inductors an auxiliary voltage of a magnitude larger than the voltage of said voltage source; and means responsive to faulty operation in said inverter bridge for concurrently disabling control of said pole switches and for triggering operation of said auxiliary voltage establishing means, thereby reverse biasing said pole switches upon the occurrence of a faulty operation.

* * * * *